United States Patent [19]

Uchanski

[11] 4,230,269
[45] Oct. 28, 1980

[54] TRACTION DEVICE

[76] Inventor: Joseph Uchanski, 2222 N. Monticello St., Chicago, Ill. 60647

[21] Appl. No.: 970,087

[22] Filed: Dec. 15, 1978

[51] Int. Cl.³ ............................................. E01B 23/00
[52] U.S. Cl. ..................................................... 238/14
[58] Field of Search .................. 238/14; 152/170, 171, 152/208

[56] References Cited

U.S. PATENT DOCUMENTS

| | | | |
|---|---|---|---|
| 1,500,249 | 7/1924 | McCracken et al. | 238/14 |
| 1,863,316 | 6/1932 | Webster, Jr. | 238/14 |
| 2,443,319 | 6/1948 | Mack | 238/14 |
| 2,486,911 | 11/1949 | Becker | 238/14 |
| 2,677,502 | 5/1954 | Denker et al. | 238/14 |
| 3,025,002 | 3/1962 | Kunz | 238/14 |
| 3,395,862 | 8/1968 | Lundberg | 238/14 |
| 3,786,989 | 1/1974 | Haynes | 238/14 |

*Primary Examiner*—John J. Love
*Assistant Examiner*—Ross Weaver

[57] ABSTRACT

The traction device is adapted to be placed under the slipping wheel of a vehicle which is disabled for lack of traction as a result of the slipping wheel being unable to develop any driving torque on top of snow, ice, mud or other slippery surface. Generally, the traction device possesses a body having rectangular shape and provided with a narrow elongated tongue to facilitate the insertion of the device underneath the slipping wheel. The device is provided with protrusions randomly disposed over the body so as to improve frictional engagement between the device and the slippery surface of the road. Additionally, the leading edge of the tongue is provided with protuberances which are adapted to engage with the surface of the slipping wheel to assist in the engagement of the device with the slipping wheel. The device is manufactured from a one-piece flat sheet of expanded metal having a plurality of elongated hexagonally-shaped interstices interconnected by bridges having slanting surfaces having sharp edges which are directed into the surfaces of both the slipping wheel and the road so as to oppose the movement of the traction device with respect to the wheel and the road.

10 Claims, 6 Drawing Figures

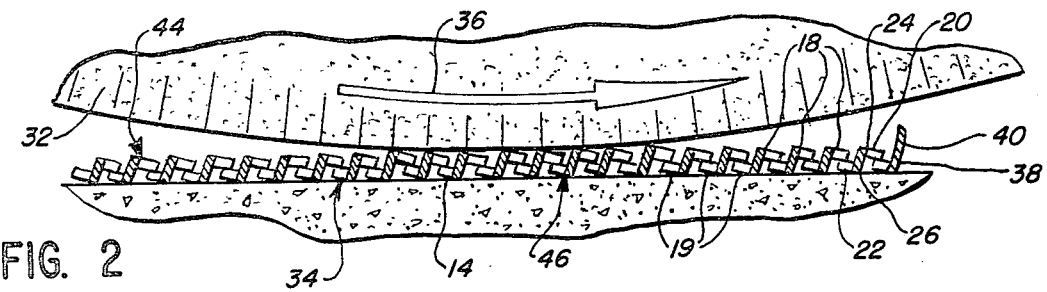
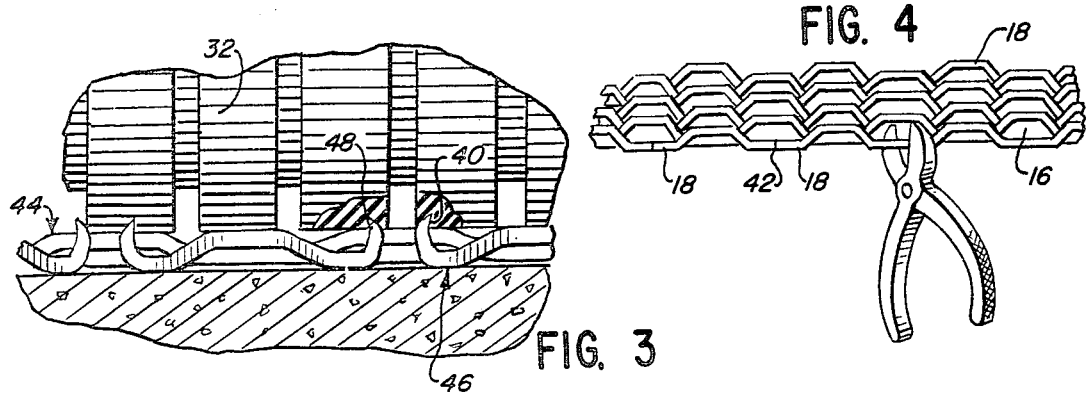
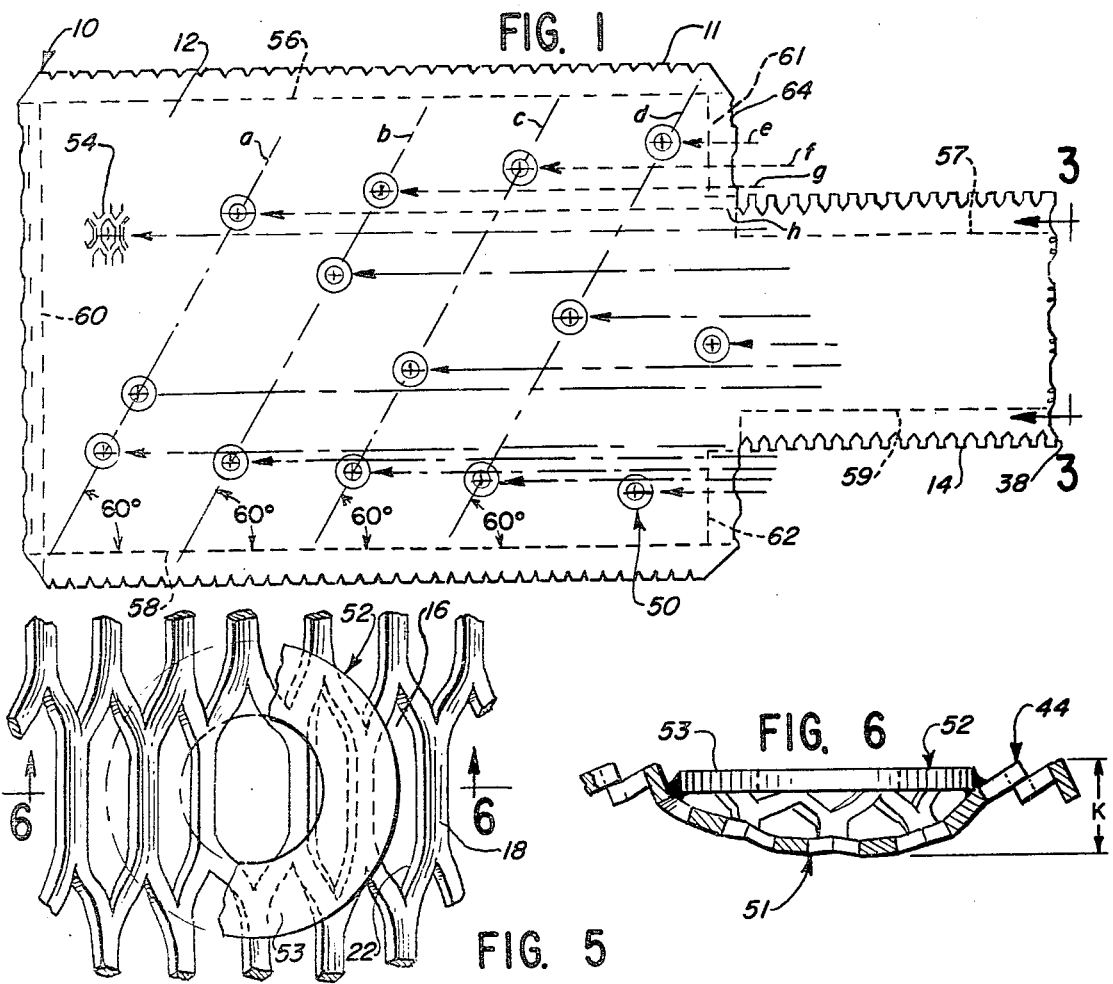

TRACTION DEVICE

BACKGROUND OF THE INVENTION

Devices for insertion between a slipping wheel of a vehicle, such as an automobile, on a slippery road surface have been used before. For example, U.S. Pat. Nos. 2,443,319 and 3,786,989 describe various traction devices made from expanded metal sheets which are rectangular in shape.

One disadvantage of these devices was the difficulty of inserting the device between the spinning wheel of the vehicle and the road surface, especially when a rut had been developed in the road surface.

Another disadvantage of these prior art devices lies in the fact that if the wheel was spinning on a hard slippery road surface, such as ice, there was a tendency for the spinning wheel to engage the leading edge of the device and then whip it violently out of contact between the spinning wheel and the slippery road surface. This presented danger to anyone standing alongside of the vehicle.

SUMMARY OF THE INVENTION

The present invention comprises a traction device adapted to be inserted between the slipping (spinning) wheel on a vehicle incapacitated as a result of the slipping wheel being on a road surface providing no traction for the propulsion of the vehicle. The traction device is manufactured from a sheet of expanded metal sheet having a rectangularly shaped body provided with an elongated narrow portion defining a tongue which is insertable between the road surface and the slipping wheel. The use of a tongue, which has a width generally corresponding to the width of the slipping wheel, enables the device to be inserted under the slipping wheel even when a rut has already been developed in the road surface by the slipping wheel.

The body of the traction device is provided with a random distribution of protrusions which extend out of the plane of the body in the direction of the road surface to further improve the engagement of the device with the road surface.

The perimetrical borders of the device, except for the leading edge of the tongue, are reinforced with rolled edges which stiffen the plane of the device to provide a flotation support over an area larger than the area of contact between the slipping wheel and the road surface and also to render harmless the sharp edges of the cut metal sheet to thereby provide safety during handling.

Since the repeated use of the traction device on a hard road surface, such as ice would decrease the depth of the protrusions, the protrusions are internally reinforced by members which are spot welded to preserve the shape of the protrusions.

To further assist and facilitate the engagement of the traction device with the slipping wheel, the leading edge of the tongue is provided with sharp protuberances which extend out of the wheel engaging surface of the device and are adapted to press into or penetrate the surface of the slipping wheel.

The traction device has been fabricated to take into consideration the internal structure possessed by the expanded metal sheet. The expanded metal sheet possesses a network of elongated hexagonal shaped interstices defined by a plurality of bridges upset out of both surfaces of the metal sheet and having slanted surfaces defining a series of opposed directionally tilted pairs of sharp edges which make the device more effective in one direction than the other when placed in a predetermined relationship with respect to the motion of the slipping wheel.

The bridges define a surface in the form of a grate, on both sides of the device. The slanted surfaces of the bridges found in the wheel engaging surface of the traction device are canted at an acute angle in the direction of the tongue.

DESCRIPTION OF THE DRAWINGS

The invention will now be described in reference to the accompanying drawings wherein:

FIG. 1 is a plan view of a traction device;

FIG. 2 presents the side view of interengagement of the traction device between a slipping wheel and a road surface;

FIG. 3 is an enlarged partial end view along plane 3—3 of FIG. 1;

FIG. 4 is a perspective end view of the traction device shown in FIG. 1;

FIG. 5 is an enlarged plan view of one of the many protrusions formed in the traction device shown in FIG. 1; and FIG. 6 is a sectional side elevation taken along the plane 6—6 of the protrusion illustrated in FIG. 5.

DESCRIPTION OF THE PREFERRED EMBODIMENT

The preferred embodiment of the invention, as shown in FIG. 1, comprises a traction device 10 made from an expanded metal sheet 12 having a generally rectangularly-shaped body 11 provided, at one of its transverse edges, with a tongue 14. The details of the expanded metal sheet construction can be seen in FIGS. 2, 4 and 5. Conventionally, the expanded sheet metal 12 is fabricated from a flat metal sheet which is subjected to a number of slits and then the sheet is stretched so that the slits are expanded into larger openings, for example, into interstices 16 possessing elongated hexagonal shapes, the adjoining interstices being interconnected by bridges 18 and 19 having respectively slanting surfaces 20 and 22 which respectively have sharp edges 24 and 26. The upper set of bridges 18 and their respective edges 24, as shown in FIG. 2, are adapted to engage a wheel 32 and the lower set of bridges 19 and their respective edges 26 are adapted to engage a road surface 34.

As shown in FIG. 2, the wheel 32 is shown in engagement with the tongue 14 of the traction device 10 lying on the road surface 34. The motion of the slipping or rolling wheel is indicated by an arrow 36.

The width of the tongue 14 is generally about the width of the wheel 32. The width of the tongue 14 is such as to enhance placement of the traction device under the slipping wheel of the disabled vehicle, even when a rut has been formed in the road surface.

In order to further improve the initial engagement between the tongue 14 and the slipping wheel 32, a leading edge 38 of the tongue 14 is provided with wheel surface penetrating members 40 more specifically defined as prongs. As shown in FIG. 4, the prongs 40 are developed along the central portion of the leading edge 38 of the tongue 14 by cutting the foremost bridges 18 in a midlocation 42 and then upsetting the prongs out of the wheel engaging surface 44, as best viewed in FIG. 3. The surface of the traction device 10 in contact with the road surface 34 is defined as a road engaging surface 46. Each prong 40 terminates in a sharp point 48 which extends anywhere from one-eighth of an inch to one-quarter of an inch above the wheel engaging surface 44. With this limited amount of extension, the prongs 40 will yield resiliently and avoid permanent deformation when the wheel 32 rolls thereover, even on a hard road surface.

The traction device 10 is provided with a plurality of protrusions 50 which are randomly spaced, more or less as shown in FIG. 1. In the particular embodiment of the traction device 10 which was developed, the protrusions 50 were impressed in the expanded metal sheet along distribution lines a, b, c and d, said distribution lines having an angular inclination of about 60° with respect to the longitudinal axis of the traction device 10. The protrusions 50 are formed in the shape of round dimples having an external spherical shape 51, as shown in FIG. 6.

In addition to the positioning of the protrusions 50 along the distribution lines a, b, c and d, each protrusion occupies a position on an individual longitudinal line, for example such as lines e, f, g and h, such lines being parallel to the longitudinal axis of the traction device. It will be noted that the longitudinal lines pass through the centers of the protrusions 50, and the adjoining lines are spaced apart by a distance which is at least equal to the width of the protrusion. With this particular arrangement of the protrusions, it is evident that when the traction device 10 is placed on a soft road surface, each protrusion will be pressed into the soft road surface and will define an individual hold for the traction device. In the event that the traction device 10 is urged by the spinning wheel 32 to move with respect to the road surface 34, any momentary movement of the traction device will cause each protrusion to develop its own rut in the soft surface. In other words, the rut which is developed by one protrusion will never be entered by another protrusion in the event the traction device should continue to move with respect to the road surface 34, thereby providing substantial resistance forces against the movement of the traction device out of the engagement between the wheel and road surfaces.

In order to improve the shape retention of the spherical shape 51 of the protrusions, each protrusion 50 is provided with a reinforcing member 52, preferably in the form of a conventional washer, as shown in FIGS. 5 and 6. The washer 52 is seated internally in the protrusion 50 and is secured therein, for example, as by spot welding in such manner that the exposed face 53 of the washer is slightly below the plane of the wheel engaging surface 44. It should be understood that the traction device need not employ the washers since it can be used without them. Even if such traction device, without any washers, is used on a hard road surface, the resiliency of the material from which such traction device is made is sufficient to retain such protrusions, to a limited degree, even after repeated use. In connection with the traction device using unreinforced protrusions, one such protrusion 54 is indicated in FIG. 1 to show the shape of the dimple.

Referring to FIGS. 1 and 2, the construction of the traction device 10 is such as to make it evident how it is to be used. A motorist will realize that the tongue 14 should be inserted under the spinning wheel 32 so that the extending prongs 40 engage and penetrate into the surface of the wheel. The wheel engaging surface 44, as briefly indicated before, is defined by the bridges 18 which have surfaces 20 slanted at an acute angle with respect to the road engaging surface 46 in the direction of the leading edge 38 of the tongue 14. The respective sharp edges 24 of the slanted surfaces 20 are directed to oppose any slipping movement of the wheel 32 relative to the wheel engaging surface 44. This relationship is preserved whether the device 10 is inserted to the rear or to the front of the wheel 32, depending on the motorist's wish to move the vehicle forwardly or backwardly. Correspondingly, the slanted surfaces 22, which define the road engaging surface 46, are also slanted at an acute angle with respect to the road engaging surface 46 in the direction of the leading edge 38 of the tongue 14. The respective sharp edges 26 of the slanted surfaces 22 are directed to oppose any slipping movement of the traction device 10 with respect to the road surface 34.

As previously mentioned, structural substance can be added to the traction device 10 by reinforcing all of the cut edges along the perimeter of the traction device 10 except the leading edge 38 of the tongue 14. Referring to FIG. 1, the longitudinal sides of the traction device has been rolled over as indicated by fold lines 56-59. Similarly, the transverse sides have been rolled over as indicated by fold lines 60-62.

If additional reinforcement is desired in the traction device 10, depending on the thickness of the expanded metal sheet, that portion of the perimeter extending along the fold lines 56, 58 and 60 may be rolled over once more to provide a double fold. Preferably, the edges are rolled under the plane of the traction device, that is, the folds will be in the road engaging surface 46 of the traction device. This arrangement improves traction with the road surface and preserves planar stability.

As a final step in the manufacture of the traction device, all corners are trimmed to present a $\frac{3}{4}$ inch, 45° angled corner to minimize potential hazards due to possible scratches and puncture wounds during handling by the motorist.

It should be pointed out that there is nothing critical in the dimensions possessed by the traction device 10. For example, the overall length of the traction device 10 may be 24 inches, the tongue 14 being 6 inches long, the width of the body 11 of the traction device being 12 inches and the width of the tongue 14 being 5 inches.

As shown in FIG. 1, there are 15 protrusions 50, however, it is clear that this number can be reduced or increased. The protrusions 50 are in the form of round dimples having a diameter of about $1\frac{1}{4}$ inches and having a depth k of about $\frac{3}{8}$ths of an inch, as shown in FIG. 6.

The traction device comprises a cold drawn steel mesh, not flattened, $\frac{1}{4} \times 20$ having a hardness of 30 Rockwell. Such mesh has a plurality of elongated hexagonal interstices 16 having major and minor axes, the minor axis being about 3/16 of an inch and the major axis being about $\frac{3}{8}$ of an inch.

The width of the rolled perimeter of the traction device 10 is about $\frac{1}{4}$ inch and this can be increased if it is found necessary, again, depending on the thickness of the steel mesh being used in fabricating the traction device 10.

The washers 50 are of standard construction and are commercially available. For example, the washer may be one inch in diameter, having a thickness of $\frac{1}{8}$ of an inch and a hole of about $\frac{3}{8}$ of an inch.

From the foregoing description of the invention, it is apparent that various modifications may be made without departing from the spirit of the invention and, therefore, it should be understood that this invention should not be limited to the exact forms, constructions, arrangements and combinations herein shown and described.

What is claimed is:

1. A device for improving traction underneath a slipping wheel of a vehicle disabled on a slippery road surface, comprising a body of substantially rectangular sheet of expanded metal sheet, and an elongated tongue extending from one of the transverse edges of said sheet to initiate interengagement between the surface of said slipping wheel and said road surface, said body including a plurality of randomly spaced protrusions, each being located along an individual line parallel to the longitudinal axis of said body, each line being spaced from an adjoining line by a distance which is at least equal to the width of the protrusion, said sheet having a wheel engaging surface and a road engaging surface.

2. A device according to claim 1, said body being provided with reinforced perimetrical edges and said tongue being provided with reinforcements along the longitudinal perimetrical edges.

3. A device according to claim 1, said protrusions being in the form of dimples, each dimple internally accommodating a reinforcing member secured within said dimple.

4. A device according to claim 1, said tongue having a leading edge provided with wheel surface engaging members extending out of said wheel engaging surface.

5. A device according to claim 4, said wheel surface engaging members being in the form of prongs developed from the body of the expanded metal sheet and turned out of the plane of said wheel engaging surface.

6. A device according to claim 1, wherein said expanded metal sheet comprises a plurality of adjoining elongated hexagonally shaped interstices, said adjoining interstices being interconnected by bridges, said bridges having slanted surfaces terminating in sharp edges and defining said wheel engaging and road engaging surfaces, the slanted surfaces being canted towards said road engaging surface in the direction of the end of said ongue.

7. A device according to claim 4, said protrusions being in the form of dimples, a reinforcing washer secured within each dimple, said wheel surface engaging members being in the form of prongs developed from the body of the expanded metal sheet and turned out of the plane of said wheel engaging surface, said expanded metal sheet comprising a plurality of adjoining elongated hexagonally shaped interstices, said adjoining interstices being interconnected by bridges, said bridges having slanted surfaces terminating in sharp edges and defining said wheel engaging and road engaging surfaces, the slanted surfaces being canted towards said road engaging surface in the direction of the end of said tongue.

8. A device according to claim 1, wherein said wheel engaging and road engaging surfaces are defined by a plurality of slanted surfaces provided with protruding edges which oppose the movement of the body relative to the wheel and the road surfaces.

9. A device for improving traction underneath a slipping wheel of a vehicle disabled on a slippery road surface, comprising a body of substantially rectangular sheet of expanded metal sheet, and an elongated tongue extending from one of the transverse edges of said sheet to initiate interengagement between the surface of said slipping wheel and said road surface, said body including a plurality of randomly spaced protrusions, each being located along an individual line parallel to the longitudinal axis of said body, each line being spaced from an adjoining line by a distance which is at least equal to the width of the protrusion, said body further being provided with reinforced perimetrical edges and said tongue being provided with reinforcements along the longitudinal perimetrical edges, said sheet having a wheel engaging surface and a road engaging surface.

10. A device for improving traction underneath a slipping wheel of a vehicle disabled on a slippery road surface, comprising a body of substantially rectangular sheet of expanded metal sheet, and an elongated tongue extending from one of the transverse edges of said sheet to initiate interengagement between the surface of said slipping wheel and said road surface, said sheet having a wheel engaging surface and a road engaging surface, said body including a plurality of randomly spaced protrusions, each being located along an individual line parallel to the longitudinal axis of said body, each line being spaced from an adjoining line by a distance which is at least equal to the width of the protrusion, said body being provided with reinforced perimetrical edges, said tongue being provided with reinforcements along the longitudinal perimetrical edges, and said tongue having a leading edge provided with wheel surface engaging members, said protrusions being in the form of dimples, a reinforcing washer secured within each dimple, said wheel surface engaging members being in the form of prongs developed from the body of the expanded metal sheet and turned out of the plane of said wheel engaging surface, said expanded metal sheet comprising a plurality of adjoining elongated hexagonally shaped interstices, said adjoining interstices being interconnected by bridges, said bridges having slanted surfaces terminating in sharp edges and defining said wheel engaging and road engaging surfaces, the slanted surfaces being canted towards said road engaging surface in the direction of said tongue.

* * * * *